US012655053B2

(12) United States Patent
He et al.

(10) Patent No.: US 12,655,053 B2
(45) Date of Patent: Jun. 16, 2026

(54) FORMING APPARATUS OF CURVED DISPLAY PANEL, FORMING METHOD THEREOF, AND CURVED DISPLAY PANEL

(71) Applicant: WUHAN CHINA STAR OPTOELECTRONICS SEMICONDUCTOR DISPLAY TECHNOLOGY CO., LTD., Wuhan (CN)

(72) Inventors: Ping He, Wuhan (CN); Liang Sun, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 1212 days.

(21) Appl. No.: 17/611,563

(22) PCT Filed: Sep. 24, 2021

(86) PCT No.: PCT/CN2021/120289
§ 371 (c)(1),
(2) Date: Mar. 16, 2023

(87) PCT Pub. No.: WO2023/035336
PCT Pub. Date: Mar. 16, 2023

(65) Prior Publication Data
US 2024/0043309 A1     Feb. 8, 2024

(30) Foreign Application Priority Data
Sep. 10, 2021   (CN) .......................... 202111060218.2

(51) Int. Cl.
*C03B 23/02*      (2006.01)
*C03B 23/023*     (2006.01)

(52) U.S. Cl.
CPC .................................. *C03B 23/023* (2013.01)

(58) Field of Classification Search
None
See application file for complete search history.

(56) References Cited

U.S. PATENT DOCUMENTS 4,034,253 A * 7/1977 Yamauchi ............... H01J 9/385
                                                      313/496
10,308,542 B2 * 6/2019 Atkins-Barratt ...... B29C 51/262
(Continued)

FOREIGN PATENT DOCUMENTS

CN         103313806 B   *  8/2016  ........... B21C 37/155
CN         107203297 A      9/2017
(Continued)

OTHER PUBLICATIONS

PE2E translation (Year: 2021).*
(Continued)

*Primary Examiner* — Jodi C Franklin
(74) *Attorney, Agent, or Firm* — PV IP PC; Christopher S. Ruprecht; Wei Te Chung

(57) ABSTRACT

A forming apparatus of a curved display panel and a forming method of same, and a curved display panel are provided. The forming apparatus includes a mapping structure with a plurality of pins and a copying jig. One end of the plurality of pins is configured to attach to a display panel. The copying jig includes a copying surface disposed under the mapping structure. The copying jig can be driven to make the copying surface attach to the other end of the plurality of pins. In this fashion, the forming apparatus can make the overall stretching process of the display panel controllable, and can also achieve a better forming effect.

12 Claims, 8 Drawing Sheets

(56) References Cited

U.S. PATENT DOCUMENTS

| | | | | |
|---|---|---|---|---|
| 10,407,335 B2 * | 9/2019 | Dabouineau | ........ | C03B 23/0357 |
| 2013/0000357 A1 * | 1/2013 | Sounni | ............... | C03B 23/0026 |
| | | | | 65/287 |
| 2016/0209970 A1 | 7/2016 | Lee | | |
| 2016/0339746 A1 * | 11/2016 | Sato | ...................... | B60C 9/0042 |
| 2017/0297944 A1 * | 10/2017 | Yea | ..................... | C03B 23/0302 |
| 2018/0072607 A1 * | 3/2018 | Fujii | ................... | C03B 23/0252 |
| 2020/0062632 A1 * | 2/2020 | Brennan | ............. | C03B 23/0307 |
| 2020/0109076 A1 * | 4/2020 | Gier | .................... | C03B 23/0235 |

FOREIGN PATENT DOCUMENTS

| | | | | | | |
|---|---|---|---|---|---|---|
| CN | 108128490 A | * | 6/2018 | ............. | B65B 33/02 | |
| CN | 109081561 A | * | 12/2018 | ............. | C03B 27/00 | |
| CN | 109677091 A | | 4/2019 | | | |
| CN | 111627338 A | | 9/2020 | | | |
| CN | 111681539 A | | 9/2020 | | | |
| CN | 111682128 A | * | 9/2020 | ......... | B32B 37/0046 | |
| CN | 112750363 A | | 5/2021 | | | |
| CN | 112863342 A | | 5/2021 | | | |
| CN | 112885239 A | | 6/2021 | | | |
| CN | 112912350 A | * | 6/2021 | ............. | C03B 35/14 | |
| CN | 113053245 A | * | 6/2021 | ......... | B29C 65/7814 | |
| CN | 113241359 A | | 8/2021 | | | |
| DE | 4112736 A | * | 10/1991 | ............... | B22C 9/06 | |
| JP | S60191621 A | * | 9/1985 | | | |
| JP | H1029829 | * | 2/1998 | ......... | C03B 23/0258 | |
| JP | H1029829 A | * | 2/1998 | ......... | C03B 23/0258 | |
| JP | H10225734 A | * | 8/1998 | | | |
| JP | HPH10225734 | * | 8/1998 | | | |
| JP | 2867611 B2 | * | 3/1999 | | | |
| JP | 3212121 B2 | * | 9/2001 | | | |
| JP | 2005179124 A | * | 7/2005 | ........... | C03B 35/187 | |
| JP | 2017001095 A | * | 1/2017 | | | |
| JP | 6069385 B2 | * | 2/2017 | ............. | B21D 53/92 | |
| JP | 6528701 B2 | * | 6/2019 | | | |
| JP | 2020001061 A | * | 1/2020 | | | |
| KR | 960004500 Y1 | * | 5/1996 | ........ | C03B 23/0258 | |
| KR | 20160088487 A | | 7/2016 | | | |
| KR | 101662584 B1 | * | 10/2016 | ........ | C03B 23/0258 | |
| KR | 101768642 B1 | * | 8/2017 | ........ | C03B 23/0235 | |
| WO | WO-2015113595 A1 | * | 8/2015 | ........ | C03B 23/0252 | |
| WO | WO-2020123368 A1 | * | 6/2020 | ............. | B60K 35/25 | |

OTHER PUBLICATIONS

PE2E translation (Year: 2020).*
PE2E translation (Year: 2019).*
PE2E translation (Year: 1998).*
Chinese Office Action issued in corresponding Chinese Patent Application No. 202111060218.2 dated Apr. 6, 2022, pp. 1-8.
Notification to Grant Patent Right for Invention issued in corresponding Chinese Patent Application No. 202111060218.2 dated Jun. 22, 2022, pp. 1-4.
International Search Report in International application No. PCT/CN2021/120289, mailed on May 26, 2022.
Written Opinion of the International Searching Authority in International application No. PCT/CN2021/120289, mailed on May 26, 2022.

* cited by examiner

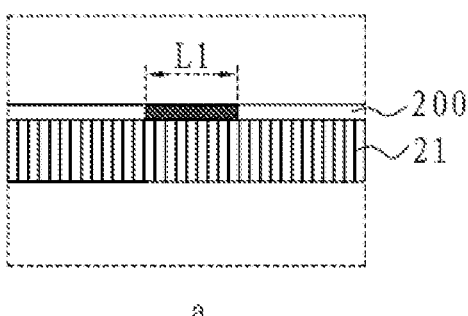
a
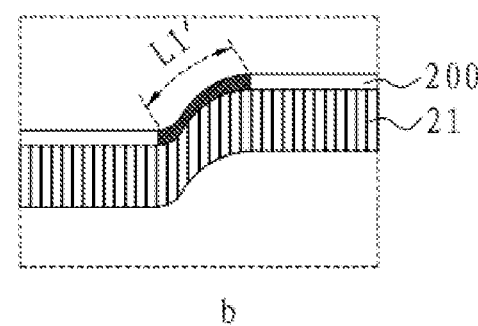
b
FIG. 9
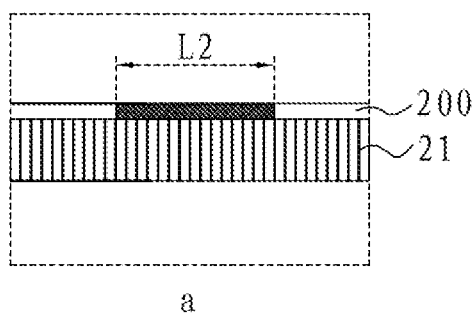
a
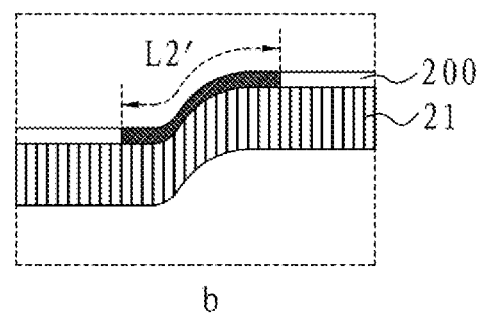
b
FIG. 10
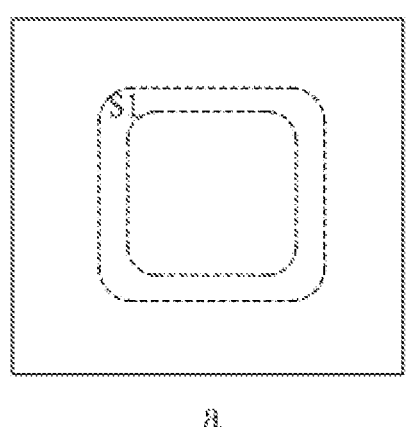
a
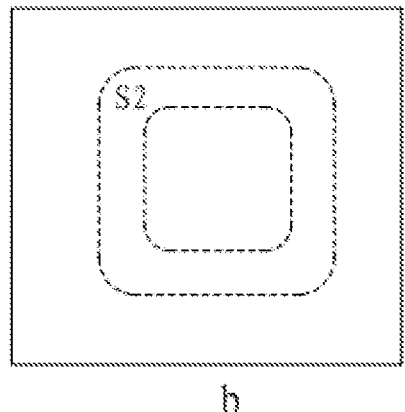
b
FIG. 11

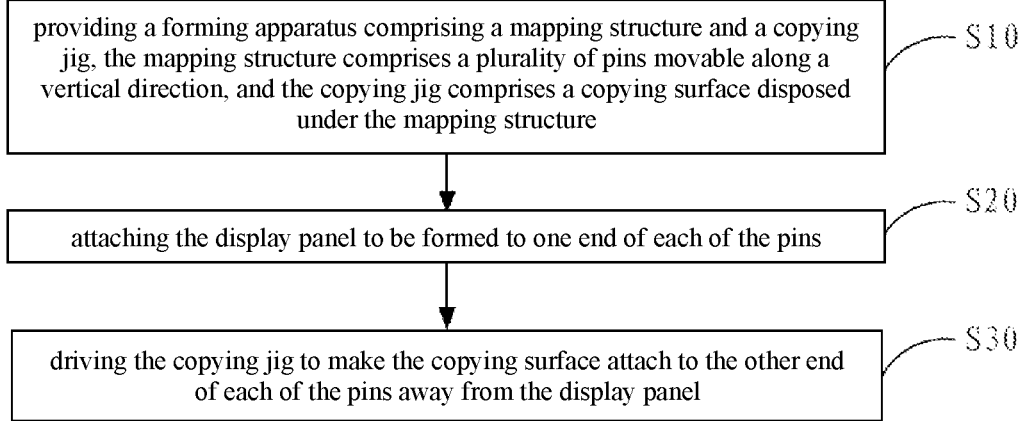

providing a forming apparatus comprising a mapping structure and a copying jig, the mapping structure comprises a plurality of pins movable along a vertical direction, and the copying jig comprises a copying surface disposed under the mapping structure — S10 attaching the display panel to be formed to one end of each of the pins — S20 driving the copying jig to make the copying surface attach to the other end of each of the pins away from the display panel — S30

FIG. 12

FORMING APPARATUS OF CURVED DISPLAY PANEL, FORMING METHOD THEREOF, AND CURVED DISPLAY PANEL

BACKGROUND OF INVENTION

1. Field of Invention

The present invention relates to a field of curved display technologies, and particularly to a forming apparatus of a curved display panel, a forming method thereof, and a curved display panel.

2. Related Art

Current full-screen mobile phones cannot achieve a true 100% full screen, but four-curved surface mobile phones equipped with lift type or under-screen cameras can visually achieve a true full screen. However, it is quite difficult for flexible display modules to realize four curved surfaces. When the flexible display modules perform three-dimensional (3D) attachment, there will be redundant parts in four corners, which will cause attaching wrinkles and affect display effects. A current conventional attachment method is to paste the display module on a carrier film, and then use vacuum suction or mold pressing to form the four curved surfaces. These methods have problems such as, being uncontrollable in forming methods and damage to the display modules during formation, resulting in difficulty in achieving required four curved surface attachment effects as required.

SUMMARY OF INVENTION

Embodiments of the present application provide a forming apparatus of a curved display panel, a forming method thereof, and a curved display panel to solve technical problems of uncontrollable risks and damage to display panels existed in conventional forming methods of curved display panels.

In order to solve the above-mentioned problems, the technical solution provided by the present application is as follows.

An embodiment of the present application provides a forming apparatus of a curved display panel, comprising a mapping structure comprising a plurality of pins movable in a vertical direction. One end of each of the pins is configured to attach to a display panel. A copying jig comprises a copying surface disposed under the mapping structure. The copying jig is configured to be driven to make the copying surface attach to another end of each of the pins away from the display panel.

In some embodiments of the present application, the copying surface comprises a first planar copying surface, a second planar copying surface, and a curved copying surface located between the first planar copying surface and the second planar copying surface. A height difference between the first planar copying surface and the second planar copying surface is H, a curvature radius of the curved copying surface is R, and a distance between the curved copying surface and the pins corresponding to the curved copying surface is P, wherein $$P \le \frac{\sqrt{2HR - H^2}}{2}.$$

In some embodiments of the present application, each of the pins comprises a pin body, a cushion located at one end of the pin body, and a lubricating layer located at another end of the pin body, the cushion is configured to attach to the display panel, and the lubricating layer is configured to attach to the copying surface.

In some embodiments of the present application, a surface energy of the cushions of the pins corresponding to the curved copying surface is less than a surface energy of the cushions of the pins corresponding to the first planar copying surface.

In some embodiments of the present application, the mapping structure is attached to the display panel through an adhesive layer, and the cushions of the pins corresponding to the curved copying surface are not bonded with the adhesive layer, and the cushions of the pins corresponding to the first planar copying surface are bonded with the adhesive layer.

In some embodiments of the present application, the cushions of the pins corresponding to the curved copying surface are doped with a lubricant.

In some embodiments of the present application, an elastic modulus of the cushions ranges from 1 giga Pascal (GPa) to 1.4 GPa.

In some embodiments of the present application, a surface friction coefficient of the lubricating layers ranges from 0.02 to 0.10.

In some embodiments of the present application, side surfaces of the pin bodies corresponding to the curved copying surface are uneven surfaces.

In some embodiments of the present application, a friction coefficient of side surfaces of the pin bodies corresponding to the first planar copying surface is less than a friction coefficient of the side surfaces of the pin bodies corresponding to the curved copying surface.

In some embodiments of the present application, a distance between the pins corresponding to the first planar copying surface and the second planar copying surface is greater than or equal to a distance between the pins corresponding to the curved copying surface.

In some embodiments of the present application, a shape of the pins comprises a cylindrical shape.

In some embodiments of the present application, a width of the pins corresponding to the first planar copying surface and the second planar copying surface is greater than or equal to a width of the pins corresponding to the curved copying surface.

In some embodiments of the present application, the curved copying surface surrounds the first planar copying surface, the second planar copying surface surrounds the curved copying surface, and the first planar copying surface is rectangle shaped, the curved copying surface is ring shaped, and the second planar copying surface ring shaped.

In some embodiments of the present application, the mapping structure comprises a base, the base comprises a plurality of limiting holes, and the pins are located in the limiting holes in a one-to-one correspondence and extend outwardly from the limiting hole.

The embodiment of the present application provides a forming method of a curved display panel, comprising S10: providing a forming apparatus comprising a mapping structure and a copying jig, the mapping structure comprises a plurality of pins movable along a vertical direction, and the copying jig comprises a copying surface disposed under the mapping structure; S20: attaching the display panel to be formed to one end of each of the pins; and S30: driving the copying jig to make the copying surface attach to the other end of each of the pins away from the display panel.

In some embodiments of the present application, the copying surface comprises a first planar copying surface, a second planar copying surface, and a curved copying surface located between the first planar copying surface and the second planar copying surface. A height difference between the first planar copying surface and the second planar copying surface is H, a curvature radius of the curved copying surface is R, and a distance between the curved copying surface and the plurality of pins corresponding to the curved copying surface is P, wherein $$P \le \frac{\sqrt{2HR - H^2}}{2}.$$

In some embodiments of the present application, the step S30 comprises S301: driving the copying jig until the first planar copying surface is attached to the other end of the pins away from the display panel, wherein no stretching is occurred on a portion of the display panel corresponding to the first planar copying surface; and S302: driving the copying jig until the curved copying surface is attached to the other end of the plurality of pins away from the display panel, wherein a portion of the display panel corresponding to the curved copying surface is stretched.

In some embodiments of the present application, the step S20 comprises step S201: attaching the display panel to be formed to a side surface of an adhesive layer; and step S202: attaching the other side surface of the adhesive layer to one end of the plurality of pins.

An embodiment of the present application further provides a curved display panel, which is prepared by using the forming method described in any of the foregoing embodiments.

In some embodiments of the present application, the curved display panel comprises a planar displaying region and a curved displaying region surrounding the planar displaying region, and an outer contour of the curved displaying region is continuous.

In some embodiments of the present application, a stretch rate of the planar displaying region is zero, and a stretch rate of the curved displaying region is greater than zero.

In some embodiments of the present application, in a direction from the planar displaying region pointing to the curved displaying region, the stretch rate of the curved displaying region gradually increases.

In some embodiments of the present application, the curved displaying region comprises four first curved displaying regions located on four sides of the planar displaying region, respectively, and a Gaussian region connecting two adjacent first curved displaying regions, wherein a stretch rate of the Gaussian region is greater than a stretch rate of the first curved displaying regions.

The present application has advantageous effects as follows: the embodiment of the present application provides the forming apparatus comprising the mapping structure and the copying jig. The mapping structure comprises the plurality of vertically movable pins. The copying jig comprises the copying surface disposed under the mapping structure. After ends of the pins is attached to the display panel, the copying jig is driven to rise until the copying surface attached to the other ends of the pins. The pins at different positions undergoes different degrees of displacement during this process. In this way, the shape of the copying surface of the copying jig is completely mapped to the display panel through the pins of the mapping structure, so that the display panel has the same curved surface shape as the copying surface of the copying jig after forming; the point-to-point forming method of the forming apparatus can make the overall stretching process of the display panel controllable and can also achieve better forming effect.

BRIEF DESCRIPTION OF DRAWINGS

In order to describe the technical solutions more clearly in the embodiments of the present application, the following will briefly introduce the drawings used in the description of the embodiments. The drawings in the following description are only some embodiments of the present application. As far as technical personnel are concerned, they can obtain other drawings based on these drawings without creative work.

FIG. 9 is a schematic diagram of the display panel before and after being stretched when cushions are not doped with lubricant in accordance with one embodiment of the present application.

FIG. 10 is a schematic diagram of a display panel before and after being stretched when the cushions are doped with lubricant in accordance with one embodiment of the present application.

FIG. 11 is a schematic planar view of the display panel before and after its formation in accordance with one embodiment of the present application.

FIG. 12 is a flowchart of a forming method of the display panel in accordance with one embodiment of the present application.

DESCRIPTION OF PREFERRED EMBODIMENTS

Figure 1:
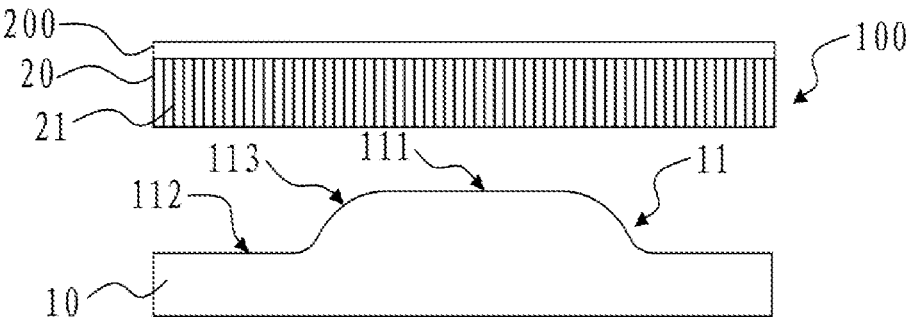
FIG. 1 is a schematic structural diagram of a display panel before its formation and a forming apparatus in accordance with one embodiment of the present application.

The description of the following embodiments refers to the attached drawings to illustrate specific embodiments in which the present application can be implemented. The directional terms mentioned in the present application, such as "up", "down"9, "front", "back", "left", "right", "inside", "outside", "side", etc., are for reference only the direction of the additional schema. Therefore, the directional terms used are used to describe and understand the present application, rather than to limit the present application. In the figure, units with similar structures are indicated by the same reference numerals.

In the description of the present application, it should be understood that the orientation or positional relationship indicated by the terms "length", "width", "upper", "lower", "vertical", etc. are based on the orientation or position shown in the drawings. The relationship is only for the convenience of describing the application and simplifying the description, rather than indicating or implying that the device or element referred to must have a specific orientation, be constructed and operated in a specific orientation, and therefore cannot be construed as a limitation of the present application. In addition, the terms "first" and "second" are only used for descriptive purposes, and cannot be understood as indicating or implying relative importance or implicitly indicating the number of indicated technical features.

Figure 2:
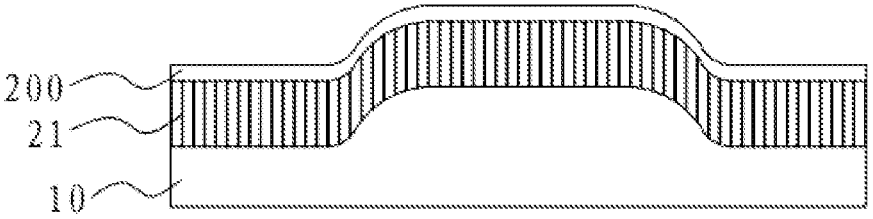
FIG. 2 is a schematic structural diagram of attachment of a display panel after its formation and the forming apparatus in accordance with one embodiment of the present application.

Please refer to FIGS. 1 and 2. FIG. 1 is a schematic structural diagram of a display panel before its formation and a forming apparatus and FIG. 2 is a schematic structural diagram of attachment of the display panel after its formation and the forming apparatus. An embodiment of the present application provides a forming apparatus 100 for a curved display panel. The forming apparatus 100 includes a mapping structure 20 and a copying jig 10. The mapping structure 20 includes a plurality of pins 21 that can move along a vertical direction. The copying jig 10 includes a copying surface 11, and the copying surface 11 is disposed under the mapping structure 20. One end of each of the pins 21 is configured to attach to the display panel 200, and the copying jig 10 can be driven so that the copying surface 11 can be attached to the other end of the pins 21 away from the display panel 200. When the copying jig 10 is being driven, the pins 21 at different positions are displaced to different degrees. Thus, when the copying surface 11 is raised to completely attach to the pins 21, a shape of the copying surface 11 of the copying jig 10 is completely mapped to the display panel 200 so that the display panel 200 after formation has a curved surface shape the same as the shape of the copying surface 11 of the copying jig 10. The forming apparatus 100 provided by the embodiment of the present application has the characteristics of point-to-point formation, which can make an overall stretching process of the display panel controllable, so that can achieve a better forming effect.

Figure 3:
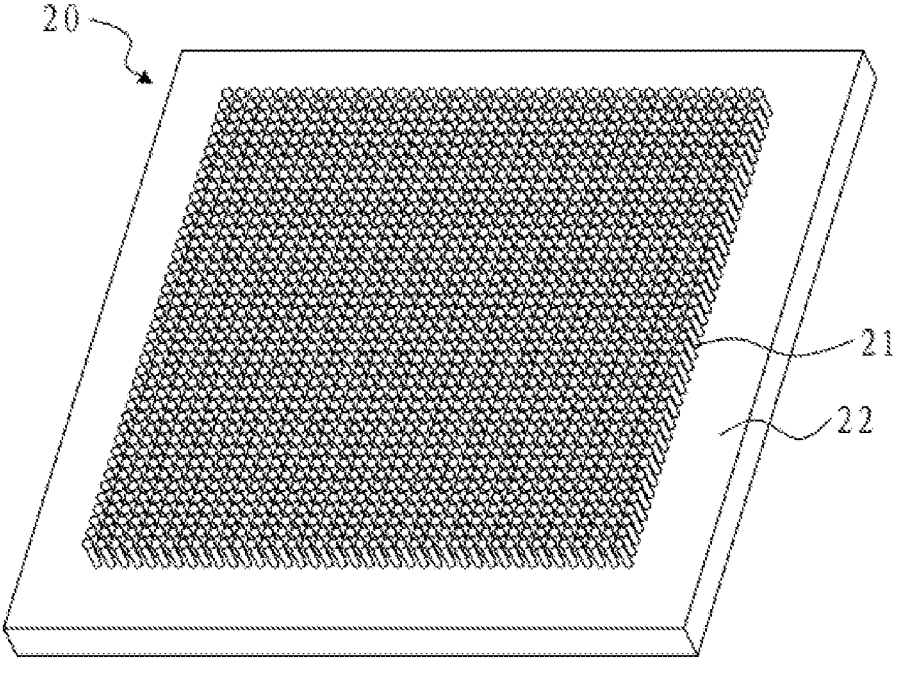
FIG. 3 is a schematic front view of a mapping structure in accordance with one embodiment of the present application.
Figure 4:
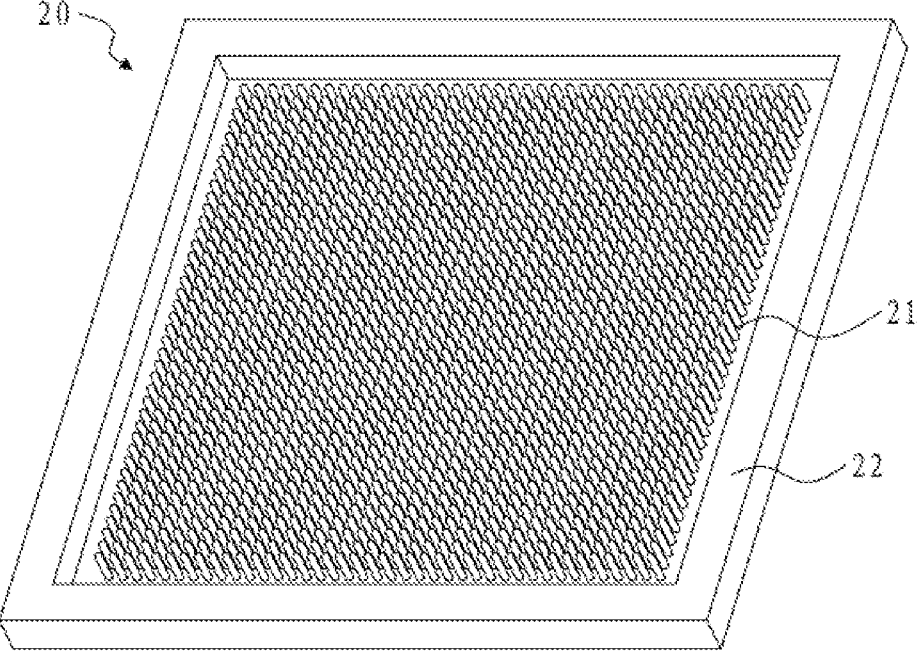
FIG. 4 is a schematic reverse view of a mapping structure in accordance with one embodiment of the present application.

Please refer to FIGS. 3 and 4. FIG. 3 is a schematic front view of the mapping structure and FIG. 4 is a schematic reverse view of the mapping structure. The mapping structure 20 includes a base 22. The base 22 includes a plurality of limiting holes configured as a limiting hole array (not shown in the figure). The limiting hole array is distributed in a middle of the base 22, the pins 21 are located in the limiting holes in a one-to-one correspondence and extend outwardly from the limiting holes. The limiting holes provide a fixing function and fix each of the pins 21 at a set position. The limiting holes are configured to allow the pin 21 to move in the vertical direction, but are not allowed to move in the horizontal direction.

It is understood that when the mapping structure 20 is not used to stretch the display panel into a curved display panel, the pins 21 of the mapping structure 20 are in a reset state. The reset state refers to that the one end of the pins 21 for attaching to the display panel 200 are flush to each other, and the other end of the pins 21 for attaching to the copying surface 11 are flush to each other.

Specifically, referring to FIG. 1, the copying surface 11 includes a first planar copying surface 111, a second planar copying surface 112, and a curved copying surface 113 located between the first planar copying surface 111 and the second planar copying surface 112. In the embodiment of the present application, the forming apparatus having the shape of the copying surface 11 can be used for forming of four-sided curved display panels, but is not limited thereto. By designing the shape of the copying surface 11, the forming apparatus can be used for forming curved display panels with an arbitrary shape.

Figure 5:
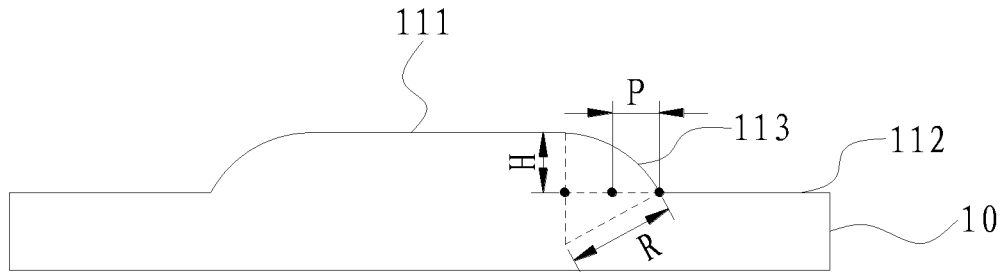
FIG. 5 is a schematic structural diagram of a copying jig in accordance with one embodiment of the present application.

Referring to FIGS. 1 and 5, in one embodiment of the present application, the curved copying surface 113 corresponds to at least three of the pins 21. The curved copying surface 113 includes a circular arc surface with at least one curvature. A height difference between the first planar copying surface 111 and the second planar copying surface 112 is H. A curvature radius of the curved copying surface 113 is R. A distance between the pins 21 corresponding to the curved copying surface 113 is P, wherein $(2P)^2 \leq R^2 - (R-H)^2$, that is $$P \leq \frac{\sqrt{2HR - H^2}}{2}.$$

The pins 21 corresponding to the curved copying surface 113 refer to the pins 21 that can be attached to the curved copying surface 113, that is, the pins 21 located above a region where the curved copying surface 113 is located. In other words, the pins 21 corresponding to the curved copying surface 113 refer to the pins 21 to be attached to a portion of the display panel where a curved surface to be formed.

Figure 6:
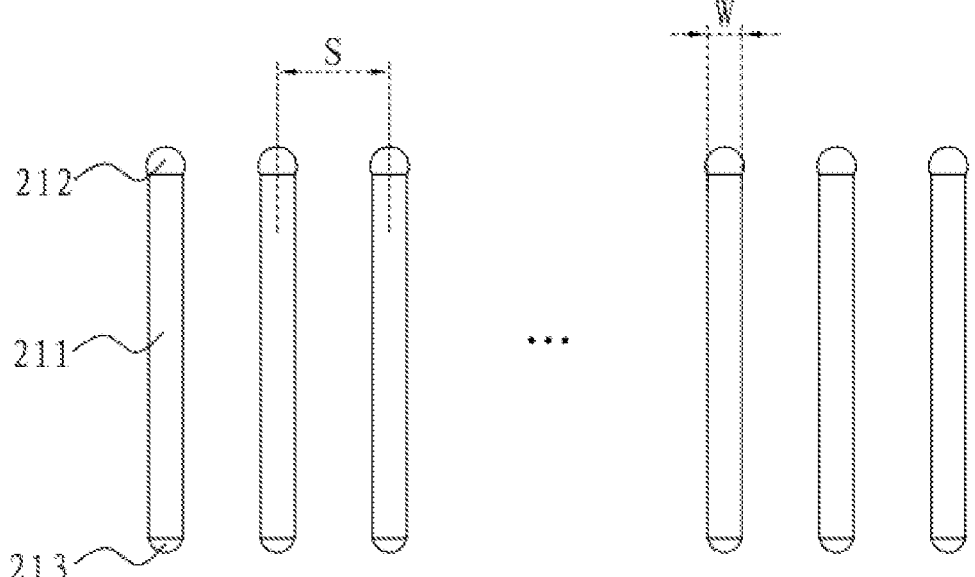
FIG. 6 is a schematic structural diagram of pins in accordance with one embodiment of the present application.

Please refer to FIG. 6. Specifically, each of the pins 21 includes a pin body 211, a cushion 212 at one end of the pin body 211, and a lubricating layer 213 at the other end of the pin body 211. The cushion 212 is used to attach to the display panel 200, and the lubricating layer 213 is used to attach to the copying surface 11.

Since the upper end of the pins 21 needs to be attached to the display panel 200, in order to prevent the pin 21 from damaging the display panel 200 during an ascent process, the cushion 212 is set at one end of the pin body 211 to protect the display panel 200. Preferably, the elastic modulus of the cushion 212 ranges from 1 giga Pascal (GPa) to 1.4 GPa. Within this elastic modulus range, the display panel 200 can be effectively prevented from being damaged.

In some embodiments of the present application, the material of the cushion 212 includes silica gel. The side surface of the cushion 212 attached to the display panel 200 may be a spherical surface.

Since the lower end of the pins 21 needs to be attached to the copying jig 10, under the driving of the copying jig 10, the pin 21 moves upward in the vertical direction. In order to prevent the friction coefficient between the pin 21 and the copying jig 10 from being too large, the lubricating layer 213 is set at the other end of the pin body 211 to serve lubrication and anti-wear functions. Preferably, a surface friction coefficient of the lubricating layer 213 ranges from 0.02 to 0.10. Within this friction coefficient range, the wear between the pin 21 and the copying jig 10 can be effectively reduced.

In some embodiments of the present application, a material of the lubricating layer 213 includes a fluororesin having a lubricating function. The fluororesin may be a Teflon material. The lubricating layer 213 can be formed by brushing a layer of Teflon material on the part of the pin body 211 that needs to be in contact with the copying jig 10.

The pin 21 may be cylindrical as a whole. Specifically, the pin body 211 may be cylindrical. In the embodiment of the present application, the side surface of the pin body 211 corresponding to the curved copying surface 113 is an uneven surface, so as to increase the damping of the side surface of the pin body 211 corresponding to the curved copying surface 113. As a result, the pin 21 moves up slowly, and the adjacent pin 21 that is not pushed by the curved copying surface 113 will not be driven upward by the display panel, thereby increasing the accuracy of the displacement of the pins 21 at each point corresponding to the curved copying surface 113. The accuracy with which the shape of the curved copying surface 113 mapped onto the display panel is further improved.

In the embodiment of the present application, since the surface where the first planar copying surface 111 is located is a flat surface, the upward displacement of each of the corresponding pins 21 is the same, and no stretching occurs. Therefore, the side surface of the pin body 211 corresponding to the first planar copying surface 111 does not need to be processed to form an uneven structure. The friction coefficient of the side surface of the pin body 211 corresponding to the first planar copying surface 111 is less than the friction coefficient of the side surface of the pin body 211 corresponding to the curved copying surface 113.

In some embodiments of the present application, the side surface of the pin body 211 corresponding to the curved copying surface 113 has an uneven structure. The side surface of the pin body 211 is frosted to increase the surface roughness to form the uneven structure. The side surface of the pin body 211 can also be coated with a damping liquid to increase the surface damping.

The material of the pin body 211 includes metal materials, such as stainless steel or hard materials.

The forming apparatus 100 of the embodiment of the present application can be applied to the forming of a display panel of a small size (such as the size of a mobile phone). A distance S between center lines of adjacent pins 21 is less than 1 millimeter (mm). A diameter W of the cylindrical shape of the pin body 211 is less than or equal to 0.5 mm. In other embodiments, the forming apparatus 100 can also be used for large sizes (such as a TV), and an actual size of the pins 21 can be designed according to a size of the forming product and an area of the stretched area.

The first planar copying surface 111 and the second planar copying surface 112 are both planar copying surfaces. Therefore, the rising heights of the pins 21 corresponding to each planar copying surfaces are the same. A portion of the display panel 200 corresponding to the planar copying surfaces will not be stretched. The curved copying surface 113 is a curved copying surface. Each of the pins 21 corresponding to the curved copying surface 113 has a different rising height. The portion of the display panel 200 corresponding to the curved copying surface 113 will be stretched and deformed. Therefore, in some embodiments, the density of the pins 21 corresponding to the first planar copying surface 111 and the second planar copying surface 112 may be smaller, and the size of the pins 21 corresponding to the first planar copying surface 111 and the second planar copying surface 112 may be larger. That is, a distance between the pins 21 corresponding to the first planar copying surface 111 and the second planar copying surface 112 is greater than or equal to a distance between the pins 21 corresponding to the curved copying surface 113. A width of the pin 21 corresponding to the first planar copying surface 111 and the second planar copying surface 112 is greater than or equal to a width of the pin 21 corresponding to the curved copying surface 113. The width of the pin 21 mentioned in this embodiment refers to the width of the cross section of the pin body 211 of the pin 21. When the shape of the pin body 211 is a cylinder, the width of the pin 21 refers to the diameter of the pin body 211.

In the embodiment of the present application, please refer to FIGS. 1 and 2, the curved copying surface 113 surrounds the first planar copying surface 111, and the second planar copying surface 112 surrounds the curved copying surface 113. The first planar copying surface 111 rectangle shaped, the curved copying surface 113 is ring shaped, and the second planar copying surface 112 is ring shaped. The copying jig 10 with the above structure can map the shape of the copying surface 11, through the pins 21, to the display panel 200 above the pins 21, and the display panel 200 to be formed is formed into a four-sided curved display panel, thereby achieving a true full screen.

Figure 7:
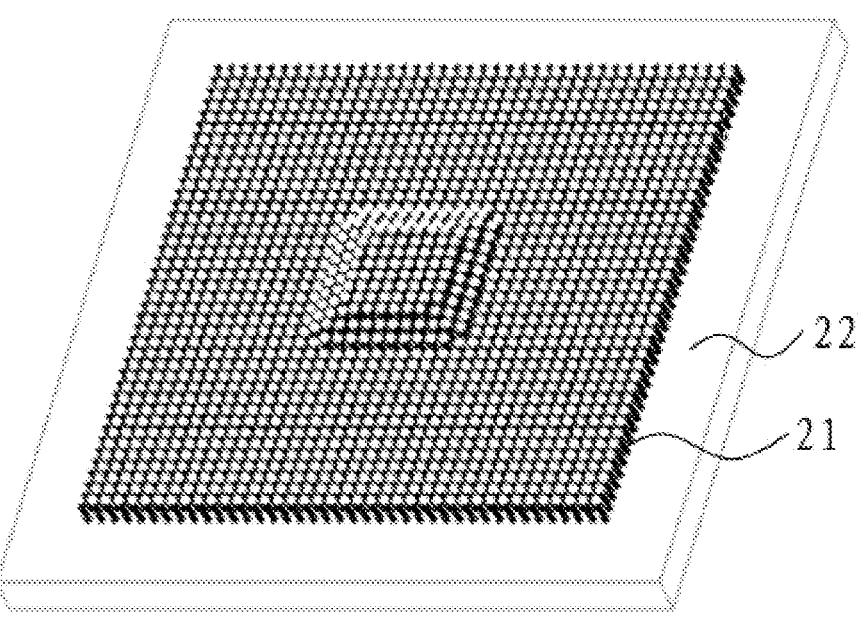
FIG. 7 is a schematic front view of the mapping structure of the display panel after its formation in accordance with one embodiment of the present application.
Figure 8:
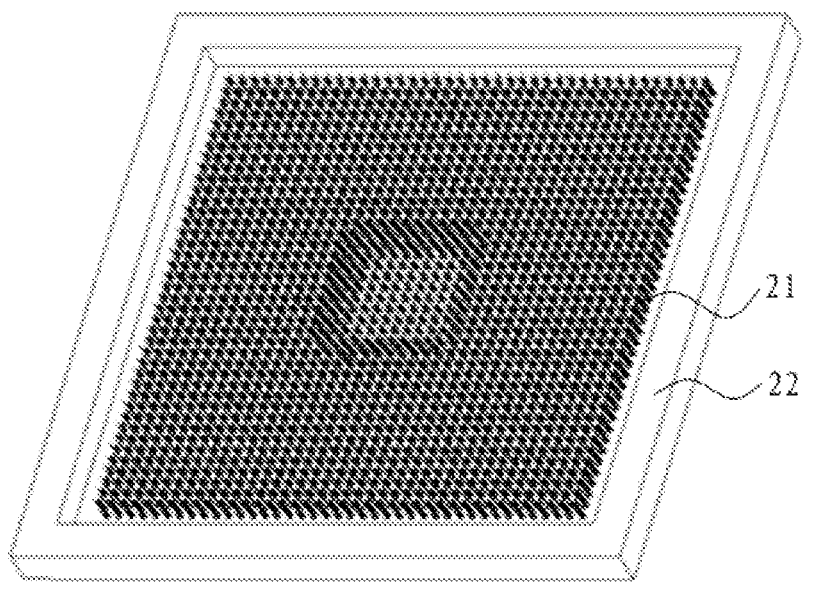
FIG. 8 is a schematic reverse view of the mapping structure of the display panel before its formation in accordance with one embodiment of the present application.

Please refer to FIGS. 7 and 8. FIG. 7 is a schematic front view of the mapping structure of the display panel after its formation. FIG. 8 is a schematic reverse view of the mapping structure of the display panel before its formation. During the forming process, the copying surface 11 moves toward a direction of attaching to the lubricating layer 213 of the pin 21. Under the action of the copying jig 10, the display panel 200 is lifted up by the pins 21. At this time, a portion of the display panel 200 corresponding to the curved copying surface 113 is partially stretched, and this stretching deformation increases with the increase of the upward movement of the pins 21 until the end of the pins 21 away from the display panel 200 is completely attached to the copying surface 11 so as to complete the forming of the display panel 200. The display panel and the pattern formed by the pins 21 corresponding to the copying surface 11 have the same shape as the copying surface 11. This forming method does not require hot pressing and vacuum adsorption. The display panel 200 can be formed under normal temperature and pressure, and the forming process is controllable, and damage to the display panel 200 can also be prevented.

Further, in some embodiments of the present application, the cushion 212 of the pin 21 corresponding to the curved copying surface 113 is doped with lubricant to reduce the surface energy of the cushion 212 corresponding to the curved copying surface 113. When the cushion 212 is in contact with the display panel 200 and the portion of the display panel 200 corresponding to the curved copying surface 113 is stretched, the display panel 200 will slide left and right relative to the pin 21, and the stretch deformation will transition to both sides, which can effectively reduce the local stress concentration of the display panel during the process of stretching and deformation. The surface energy mentioned in the embodiments of the present application refers to the excess energy on the surface of the material relative to the interior of the material. The lower the surface energy of the surface of the adherend, the worse the wettability and the worse the bonding effect.

Specifically, the display panel 200 is attached to the pins 21 through an adhesive layer (not shown in the figure). By performing surface energy reduction treatment on the cushion 212 corresponding to the curved copying surface 113, the surface energy is low enough to prevent the cushion 212 from bonding on the adhesive layer. The cushion 212 corresponding to the first planar copying surface 111 does not undergo stretching deformation, so the cushion 212 corresponding to the first planar copying surface 111 does not need surface energy reduction treatment. The cushion 212 of the pin 21 corresponding to the first planar copying surface 111 is bonded on the adhesive layer to serve a fixing function and prevent displacement of the display panel 200 during the forming process.

The lubricant includes fluororesin. Specifically, the cushion 212 can be swelled in an organic solvent (alcohol, xylene, etc.) in advance, and then placed in a fluororesin solution to make the fluororesin penetrate into the tissue of the cushion. After the solvent evaporates, the fluororesin will be enclosed in the cushion, and the cushion after such treatment has the characteristics that the lubricating coating is not easy to fall off, the lubricity is long-lasting, its surface energy is low, and it cannot be bonded with optical clear adhesive (OCA) and other adhesive layers. In other embodiments, a layer of fluororesin solution can also be directly coated on the surface of the cushion, but after a period of use, the coating is likely to fall off and the lubricity will be reduced. The fluororesin may specifically be Teflon, the surface tension of Teflon is only 0.019 N/m, the surface energy is small, and the bonding performance with adhesive layers such as OCA is poor. The size of the surface energy of the cushion depends on the type of lubricants such as fluororesin and the type of adhesive layer to determine.

During the forming process of the display panel, the display panel corresponding to the curved copying surface 113 is partially stretched. The pins 21 corresponding to the curved copying surface 113 are displaced to different degrees. The stretching deformation of the display panel increases with the upward movement of the pins. Since the tips of the pins 21 corresponding to the curved copying surface 113 of the embodiment have low surface energy cushions, the cushions are not bonded on the adhesive layer, and the display panel can slightly slide along the plane direction. Therefore, the stretching deformation of the display panel 200 hereof will transit to both sides, and the transition can effectively reduce the local stress concentration of the display module during the entire process of the stretching deformation.

Please refer to FIGS. 9 and 10. FIG. 9 is a schematic diagram of the display panel before and after being stretched when the cushions are not doped with lubricant. FIG. 10 is a schematic diagram of the display panel before and after being stretched when the cushions are doped with lubricant. As shown in FIGS. 9a and 9b, since no lubricant is added, the cushions are bonded and fixed with the display panel 200 through the adhesive layer, and no slide can occur between the pins 21 and the display panel 200. At this time, the stretching and deformation area of the display panel is the area corresponding to the curved copying surface 113. The perimeter of the cross section of the display panel participating in the deformation is stretched from L1 to L1'. As shown in FIGS. 10a and 10b, the cushions of the pins 21 corresponding to the curved copying surface 113 are doped with lubricant, the surface energy of the cushions are reduced, and the portion of the display panel corresponding to the pins 21 can slide horizontally. At this time, the area where the display panel participating stretching and deformation will extend in a basis of the area corresponding to the curved copying surface 113 (from L1 to L2). The perimeter of the cross section of the display panel participating in the deformation is stretched from L2 to L2'. Since shape of the copying surface 11 of the copying jig 10 are the same to the two stretching methods, so ΔL=L1'−L1=L2'−L2.

Please refer to FIG. 11. FIG. 11a is a schematic planar view of the display panel before and after forming when no lubricant is doped. FIG. 11b is a schematic planar view of the display panel before and after forming when lubricant is doped to the cushions 212 of the pins 21 corresponding to the curved copying surface 113. The use of the pins 21 doped with lubricant increases the original area of the area of the display panel 200 participating in the stretching deformation from S1 to S2, and the actual deformation area after stretching is ΔS=ΔL×C, where C is the perimeter of the edge of the curved surface of the display panel where the curvature has a sudden change at the intersection. Since the shape of the copying jig 10 remains unchanged, C is a constant. The stretch rate of the display panel is ΔS/S, and ΔS/S=(ΔL×C)/S, so the stretch rate of the display panel is related to the area of the stretched deformation area. The larger the area of the stretched deformation area, the smaller stretch rate of the display panel is. The design of the cushions of the pins doped with lubricant can make the display panel have a larger area to participate in stretching. The smaller the stretching rate of the display panel during the stretching process, the easier it is to achieve the attachment effect of curved surface and improve the success rate of bending forming.

In the embodiment of the present application, the display panel 200 is a stretchable display panel, which includes any one of an organic light-emitting diode (OLED) display panel and a micro LED display panel.

The display panel 200 has a stretchable island bridge structure, which includes a plurality of pixel islands and connecting bridges connecting two adjacent pixel islands. The pixel islands are set with pixel drive circuits and pixel light-emitting units electrically connected to the pixel drive circuits. The connecting bridges are set with a plurality of wires electrically connecting pixel drive circuits of two adjacent pixel islands. A shape of the connecting bridges includes a serpentine shape or an S shape. The pixel islands may be rigid islands. When the display panel 200 is stretched and deformed, the connecting bridges participate in the stretching, and the pixel islands do not stretch, thereby protecting the devices of the pixel islands away from effect.

The display panel 200 may further include a first flexible supporting layer disposed on one side of the pixel island and the connecting bridge, and a second flexible supporting layer disposed on the other side of the pixel island and the connecting bridge. The first flexible supporting layer and the second flexible supporting layer serve support and protection function, and prevent the pixel islands and the connecting bridges from being twisted and deformed during the stretching process of the display panel 200. The material of the first flexible supporting layer and the second flexible supporting layer includes a polydimethylsiloxane (PDMS) substrate with excellent elasticity.

Compared with a conventional display panel, the display panel 200 with the above-mentioned stretchability can be partially stretched and deformed under the action of external force when 3D attachment is performed to realize the four-curved surface display, and there will be no redundant parts in the four corners and no wrinkles will occur. The display panel 200 with the above-mentioned stretchability can be stretched from a flat state to a required specific four curved surface state under the action of the forming apparatus 100 of the embodiment of the present application, and the forming method using the forming apparatus 100 of the embodiment of the present application can be carried out at room temperature, and at the same time, it can ensure that the overall stretching deformation process of the display panel 200 is controllable.

Figure 13:
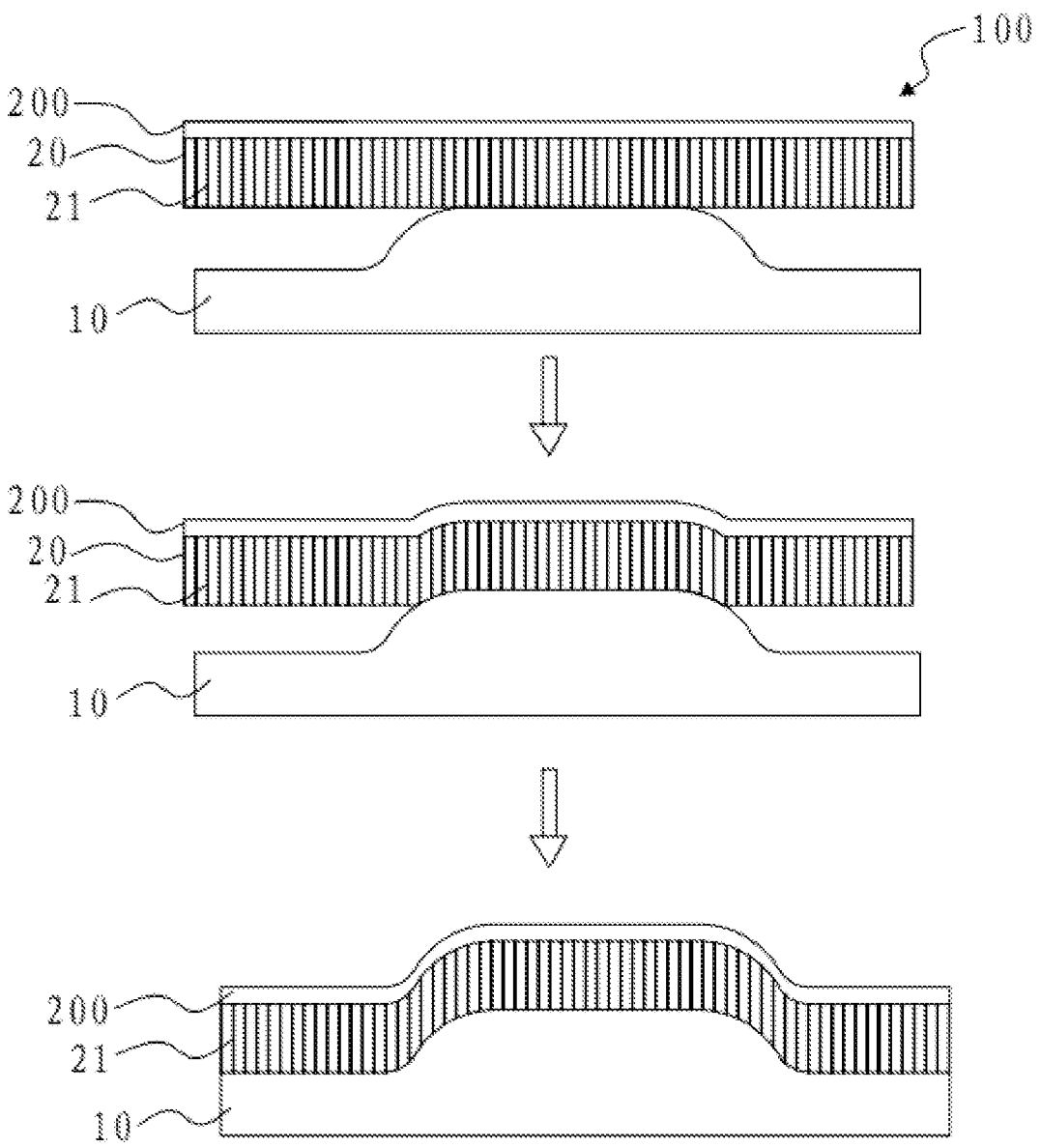
FIG. 13 is a schematic structural diagram of a forming procedure of the display panel in accordance with one embodiment of the present application.

Please refer to FIGS. 12 and 13, based on the forming apparatus 100 in the above embodiment, an embodiment of the present application also provides a method for forming a curved display panel, including: S10: a forming apparatus 100 is provided and including a mapping structure 20 and a copying jig 10, wherein the mapping structure 20 includes a plurality of pins 21 that can move along a vertical direction, and the copying jig 10 includes a copying surface 11 disposed under the mapping structure 20; S20: the display panel 200 to be formed is attached to one end of each of the pins 21; S30: the copying jig 10 is driven so that the copying surface 11 is attached to the other end of each of the pins 21 away from the display panel 200.

Specifically, the display panel 200 to be formed is attached to one side surface of an adhesive layer; and the other side surface of the adhesive layer is attached to the one end of the pins 21.

It can be understood that when the display panel to be formed is attached to the pins 21 through the adhesive layer, all the pins 21 of the mapping structure 20 are in the reset state, that is, the ends of the pins 21 at the same side are on the same horizontal plane.

The attachment of the copying surface 11 and the pins 21 including: S301: driving the copying jig 10 to the first planar copying surface 111 to attach to the other ends of the pins 21 away from the display panel 200, wherein the portion of the display panel 200 corresponding to the first planar copying surface 111 does not stretch.

S302: driving the copying jig 10 to the curved copying surface 113 to attach to the other end of the pins 21 away from the display panel 200, wherein the portion of the display panel 200 corresponding to the curved copying surface 113 is partially stretched; during this process, the pins 21 corresponding to the first planar copying surface 111 also move upward in the vertical direction, so that the area of the display panel corresponding to the first planar profiling surface 111 rises upward, but no stretching occurs.

Figure 14:
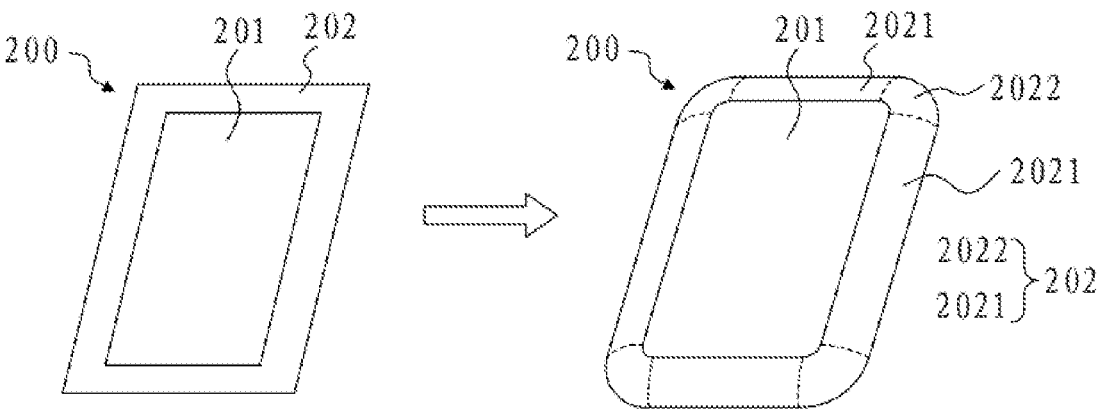
FIG. 14 is a schematic structural diagram of a curved display panel in a flat state and a curved state in accordance with one embodiment of the present application.

Based on the above-mentioned forming method and the application of the forming apparatus, an embodiment of the present application further provides a curved display panel, which is prepared by the above-mentioned forming method. Please refer to FIG. 14. FIG. 14 is a schematic structural diagram of the curved display panel in a flat state and a curved state. The curved display panel 200 includes a planar displaying region 201 and a curved displaying region 202. The curved displaying region 202 surrounds the planar displaying region 201. The planar displaying region 201 corresponds to the first planar copying surface 111. The curved displaying region 202 corresponds to the curved copying surface 113. The curved display panel 200 is a stretchable display panel. For the description of the stretchable display panel, reference may be made to the foregoing description.

Figure 15:
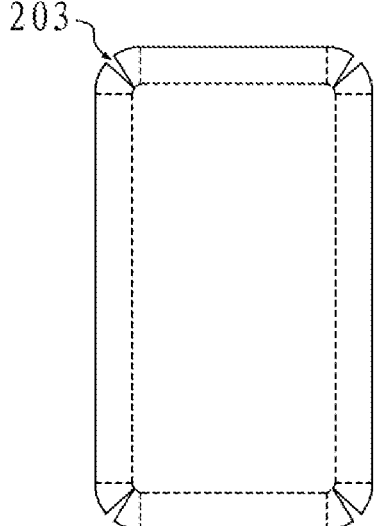
FIG. 15 is a schematic structural diagram of a curved display panel of the prior art in a flat state.

Please refer to FIG. 14, in the embodiment of the present application, the outer contour of the curved displaying region 202 of the curved display panel 200 is continuous, and the embodiment of the present application does not require special-shaped cutting at the corners of the display panel 200 to form a four-sided curved shape. In the prior art, as shown in FIG. 15, which is a schematic structural diagram of a curved display panel of the prior art in a flat state. Generally, in order to prevent the display panel from wrinkling at the corners during the curved surface forming process, the edges and corners of the display panel are cut using special-shaped cutting to form notches 203. The outer contour of the curved displaying region 202 of the conventional display panel is discontinuous and is equipped with a notch.

Further, since lifted heights of the planar displaying region 201 are the same everywhere, the planar displaying region 201 will not be stretched, and a stretching rate of the planar displaying region 201 is zero. Since the display surface of the curved displaying region 202 is a curved surface, and different positions thereof are lifted to different heights, the curved displaying region 202 is stretched, and the stretch rate of the curved displaying region 202 is greater than zero.

When the curved display panel 200 is placed on a horizontal plane, (i.e., the horizontal plane is parallel to the plane where the planar displaying region 201 is located), the unit area of the horizontal plane is S0. In the unit area of the horizontal plane, the actual surface of the curved display panel 200 facing the unit area of the horizontal plane is SA. The stretch rate of the curved display panel 200 having a curved shape can be defined as the ratio of (SA-S0) to S0. The measurement of the actual area of the curved display panel 200 facing the unit area can be obtained by scanning and calculating with a 3D measuring instrument. The greater the stretch rate of a certain area of the curved display panel 200, the greater the corresponding curvature, and the greater the corresponding stretch degree.

In the embodiment of the present application, please refer to FIG. 14, in the curved display panel 200, along the planar displaying region 201 pointing to the curved displaying region 202, the stretch rate of the curved displaying region 202 is gradually increased, and the degree of stretching is gradually increased.

Specifically, the curved display panel 200 may be a four-curved surface display panel, and the curved displaying region 202 includes first curved displaying regions 2021 located on four sides of the planar displaying region 201, and Gaussian regions 2022 connecting two adjacent first curved displaying regions 2021. The stretch rate of the Gaussian regions 2022 is greater than the stretch rate of the first curved displaying regions 2021.

Compared with the prior art in FIG. 15, there is no need to perform special-shaped cutting in the Gaussian region 2022 in the embodiment of the present application, and there is no seam between two adjacent first curved displaying regions 2021. However, in the prior art, due to the special-shaped cutting is performed at the corners to form the notches 203, resulting in seams in the curved display area.

Each side of the planar displaying region 201 corresponding to the first curved displaying region 2021 is stretched along a direction perpendicular to the side, that is, the first curved displaying region 2021 is stretched only along one direction. The Gaussian region 2022 is located at the corners of the curved display panel 200 and is adjacent to the first curved displaying regions 2021 with two different stretching directions. Therefore, the Gaussian region 2022 will be stretched in two directions. The stretching degree of the Gaussian region 2022 is greater than the stretching degree of the first curved displaying region 2021.

In summary, the embodiment of the present application provides a forming apparatus of a curved display panel and a molding method thereof, and a curved display panel. The forming apparatus 100 includes a mapping structure 20 and a copying jig 10. The mapping structure 20 includes a plurality of vertically movable pins 21. The copying jig 10 includes a copying surface 11 disposed under the mapping structure 20. After one end of each of the pins 21 is attached to the display panel 200, the copying jig 10 is driven to rise until the copying surface 11 attached to the other end of the pins 21. The pins 21 at different positions undergoes different degrees of displacement during this process. In this way, the shape of the copying surface 11 of the copying jig 10 is completely mapped to the display panel 200 through the pins of the mapping structure 20, so that the display panel has the same curved surface shape as the copying surface 11 of the copying jig 10 after being formed; the point-to-point forming method of the forming apparatus can make the overall stretching process of the display panel controllable and can also achieve a better forming effect.

In the above-mentioned embodiments, the description of each embodiment has its own emphasis. For parts that are not described in detail in an embodiment, reference may be made to related descriptions of other embodiments.

A forming apparatus of a display panel and a forming method thereof, and a curved display panel provided by the embodiments of the present application are described in detail above. Specific examples are used in this article to illustrate the principles and implementations of the present application. The description of the above embodiments is only used to help understand the technical solutions and core ideas of the present application; those of ordinary skill in the art should understand that they can still modify the technical solutions recorded in the foregoing embodiments, or make equivalents to some of the technical features. Replacement; and these modifications or replacements do not cause the essence of the corresponding technical solutions to deviate from the scope of the technical solutions of the embodiments of the present application.

What is claimed is:

1. A forming apparatus for a curved display panel, comprising:

a mapping structure comprising a plurality of pins movable in a vertical direction, wherein one end of each of the pins is configured to attach to a display panel; and a copying jig comprising a copying surface disposed under the mapping structure;

wherein the copying jig is configured to be driven to make the copying surface attach to another end of each of the pins away from the display panel, the copying surface comprises a first planar copying surface, a second planar copying surface, and a curved copying surface located between the first planar copying surface and the second planar copying surface, each of the pins corresponding to the first planar copying surface and the second copying surface has a same rising height and each of the pins corresponding to the curved copying surface has a different rising height, and wherein each of the plurality of pins is provided with cushions at an end configured to attach to the display panel, a surface energy of the cushions of the pins corresponding to the curved copying surface is less than a surface energy of the cushions of the pins corresponding to the first planar copying surface, and wherein the surface energy refers to an excess energy on a surface of a material relative to an interior of the material.

2. The forming apparatus of claim 1, wherein a height difference between the first planar copying surface and the second planar copying surface is H, a curvature radius of the curved copying surface is R, and a distance between the curved copying surface and the plurality of pins corresponding to the curved copying surface is P, and wherein $$P \le \frac{\sqrt{2HR - H^2}}{2}.$$

3. The forming apparatus of claim 2, wherein the curved copying surface surrounds the first planar copying surface, the second planar copying surface surrounds the curved copying surface, and the first planar copying surface is rectangle shaped, the curved copying surface is ring shaped, and the second planar copying surface is ring shaped.

4. The forming apparatus of claim 2, wherein each of the pins comprises a pin body, a cushion located at one end of the pin body, and a lubricating layer located at another end of the pin body, the cushion is configured to attach to the display panel, and the lubricating layer is configured to attach to the copying surface.

5. The forming apparatus of claim 4, wherein an elastic modulus of the cushions ranges from 1 giga Pascal (GPa) to 1.4 GPa, and a surface friction coefficient of the lubricating layers ranges from 0.02 to 0.10.

6. The forming apparatus of claim 4, wherein side surfaces of the pin bodies corresponding to the curved copying surface are uneven surfaces.

7. The forming apparatus of claim 6, wherein a friction coefficient of side surfaces of the pin bodies corresponding to the first planar copying surface is less than a friction coefficient of the side surfaces of the pin bodies corresponding to the curved copying surface.

8. The forming apparatus of claim 4, wherein a distance between the pins corresponding to the first planar copying surface and the second planar copying surface is greater than or equal to a distance between the pins corresponding to the curved copying surface.

9. The forming apparatus of claim 4, wherein a width of the pins corresponding to the first planar copying surface and the second planar copying surface is greater than or equal to a width of the pins corresponding to the curved copying surface.

10. The forming apparatus of claim 1, wherein the mapping structure is attached to the display panel through an adhesive layer, and the cushions of the pins corresponding to the curved copying surface are not bonded with the adhesive layer, and the cushions of the pins corresponding to the first planar copying surface are bonded with the adhesive layer.

11. The forming apparatus of claim 10, wherein the cushions of the pins corresponding to the curved copying surface are doped with a lubricant.

12. The forming apparatus of claim 1, wherein the mapping structure comprises a base, the base comprises a plurality of limiting holes, and the pins are located in the limiting holes in a one-to-one correspondence and extend outwardly from the limiting hole.

* * * * *